J. B. OWENS.
KILN.
APPLICATION FILED JULY 15, 1916.
1,288,975.
Patented Dec. 24, 1918.
5 SHEETS—SHEET 1.
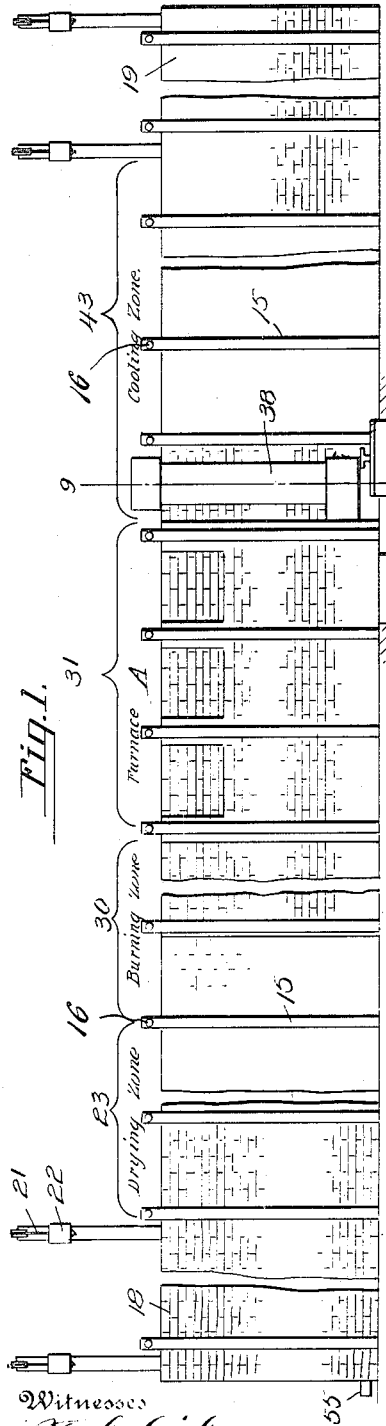
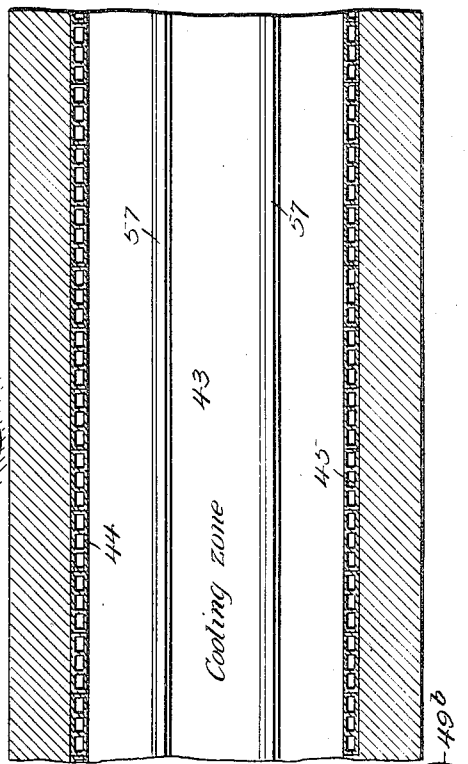
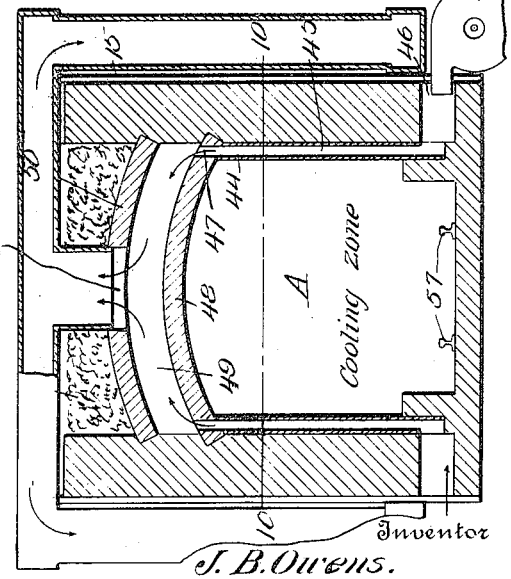
Inventor
J. B. Owens.
By Victor J. Evans
Attorney
Witnesses

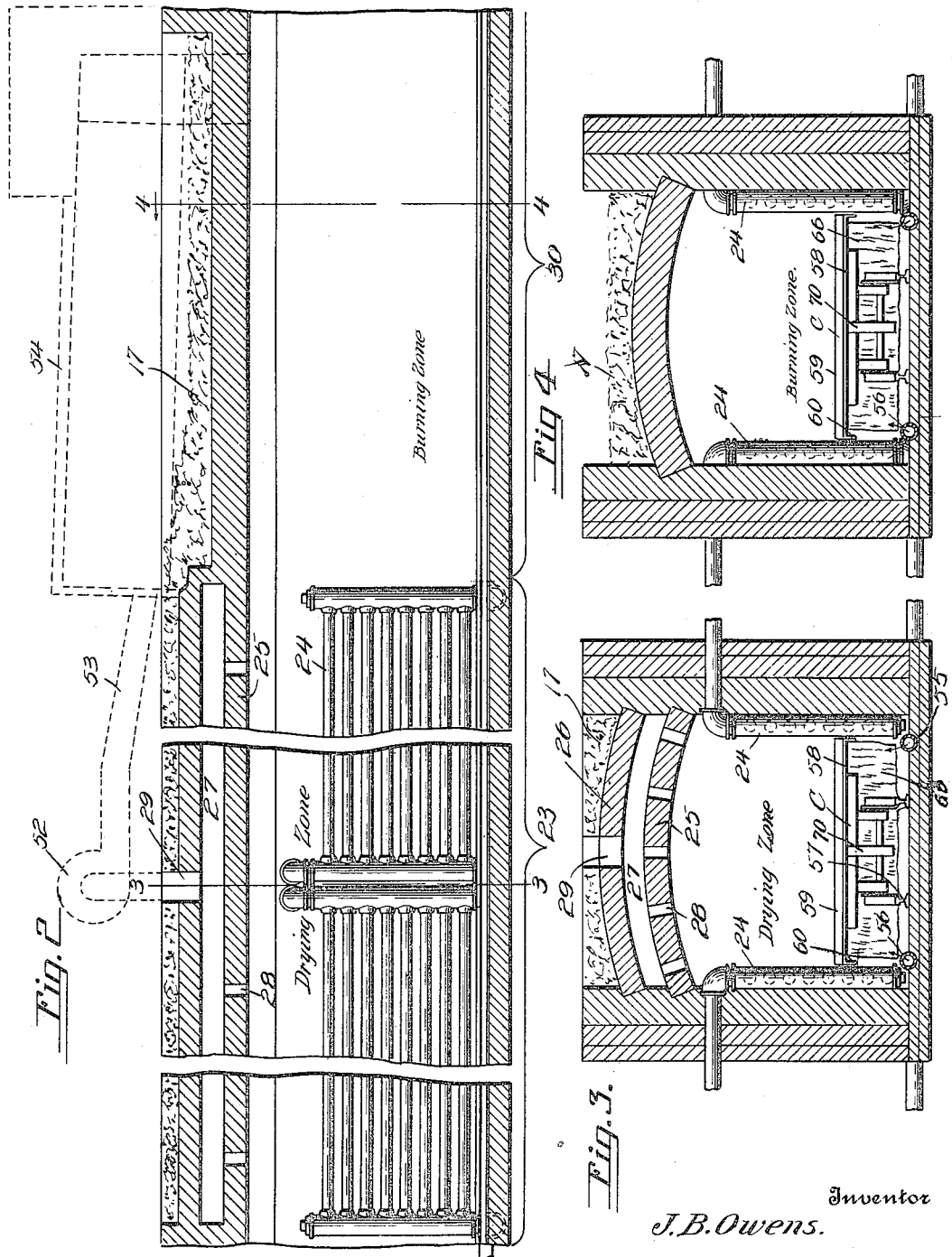

J. B. OWENS.
KILN.
APPLICATION FILED JULY 15, 1916.

1,288,975.

Patented Dec. 24, 1918.
5 SHEETS—SHEET 3.

Inventor
J. B. Owens.
By Victor J. Evans
Attorney

Witnesses

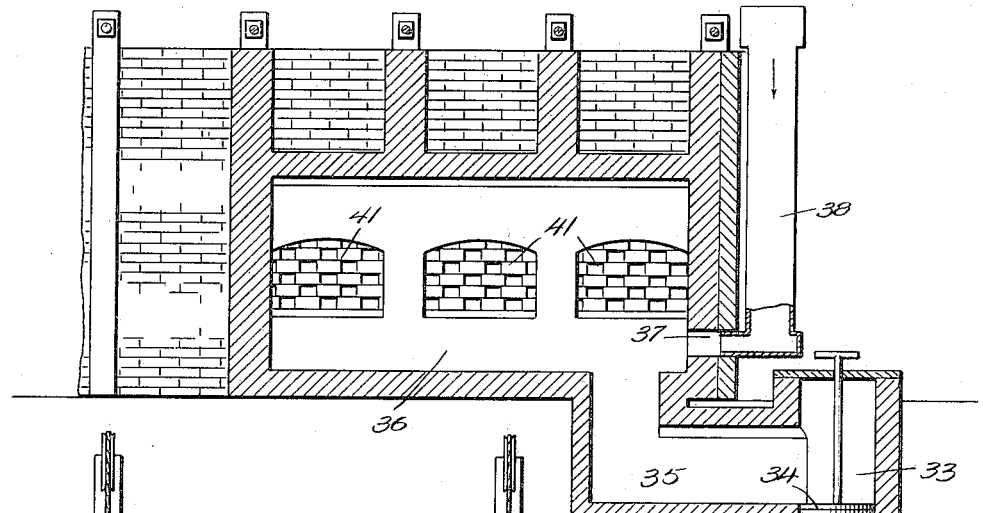
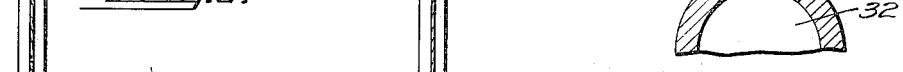
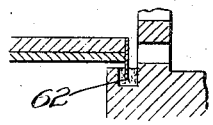
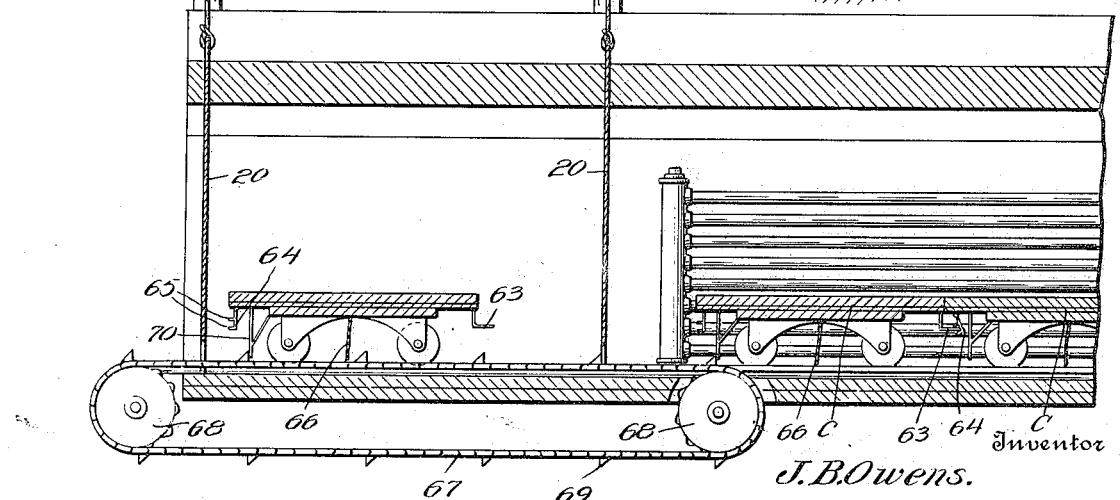

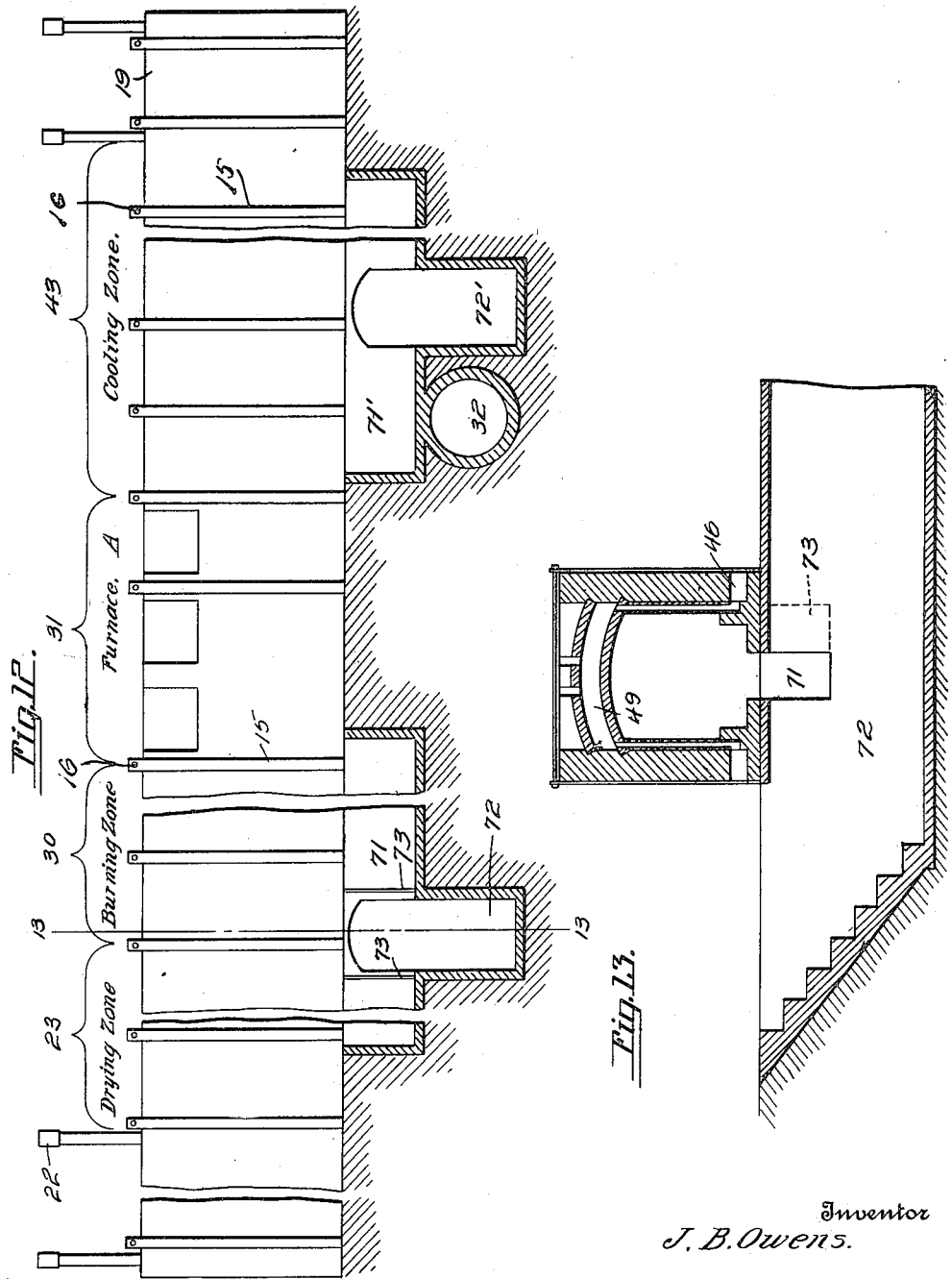

UNITED STATES PATENT OFFICE.

JOHN B. OWENS, OF METUCHEN, NEW JERSEY.

KILN.

1,288,975. Specification of Letters Patent. Patented Dec. 24, 1918.

Application filed July 15, 1916. Serial No. 109,511.

*To all whom it may concern:*

Be it known that I, JOHN B. OWENS, a citizen of the United States, residing at Metuchen, in the county of Middlesex and State of New Jersey, have invented new and useful Improvements in Kilns, of which the following is a specification.

This invention relates to kilns for burning pottery ware and clay products of all descriptions, and it has particular reference to a type of kiln known as a "tunnel kiln" through which the ware to be burned constantly moves, the green ware entering at one end of the tunnel through which it moves, constantly or intermittently, being subjected during a predetermined period to heat of sufficient intensity to produce the desired result, and the finished ware emerging at the other end of the tunnel.

One object of the invention is to produce a tunnel kiln embodying a drying zone, a burning zone and a cooling zone, the same being constructed and arranged in a simple and improved manner.

A further object of the invention is to produce a kiln of the character described provided with air locks at the entrance and discharge ends thereof.

A further object of the invention is to produce a kiln of the character described which may be utilized with fuel of any well known description, such as gas, oil, coal, wood or the like.

A further object of the invention is to simplify and improve the interior construction and arrangement of the kiln and the means for conveying through the kiln the ware or material that is to be burned.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a view in side elevation of a kiln constructed in accordance with the invention, the same being arranged to use producer gas as a fuel, and said view showing also a portion of the gas main in section.

Fig. 2 is a longitudinal sectional view showing a portion of the coil drying zone and also a portion of the burning zone of the kiln.

Fig. 3 is a transverse sectional view taken on the line 3—3 in Fig. 2.

Fig. 4 is a transverse sectional view taken on the line 4—4 in Fig. 2.

Fig. 7 is a vertical sectional detail view taken on the line 7—7 in Fig. 5.

Fig. 8 is a longitudinal vertical sectional view showing the air lock at the entrance of the kiln and showing also a portion of the coil drying zone.

Fig. 9 is a transverse sectional view taken through the cooling zone on the plane indicated by the line 9—9 in Fig. 1.

Fig. 10 is a horizontal sectional detail view taken on the line 10—10 in Fig. 9.

Fig. 11 is a sectional detail view, enlarged, showing the sand seal.

Fig. 12 is a sectional elevation illustrating a modification.

Fig. 13 is a transverse sectional view taken on the line 13—13 in Fig. 12.

Corresponding parts in the several figures are denoted by like characters of reference.

Figure 5:
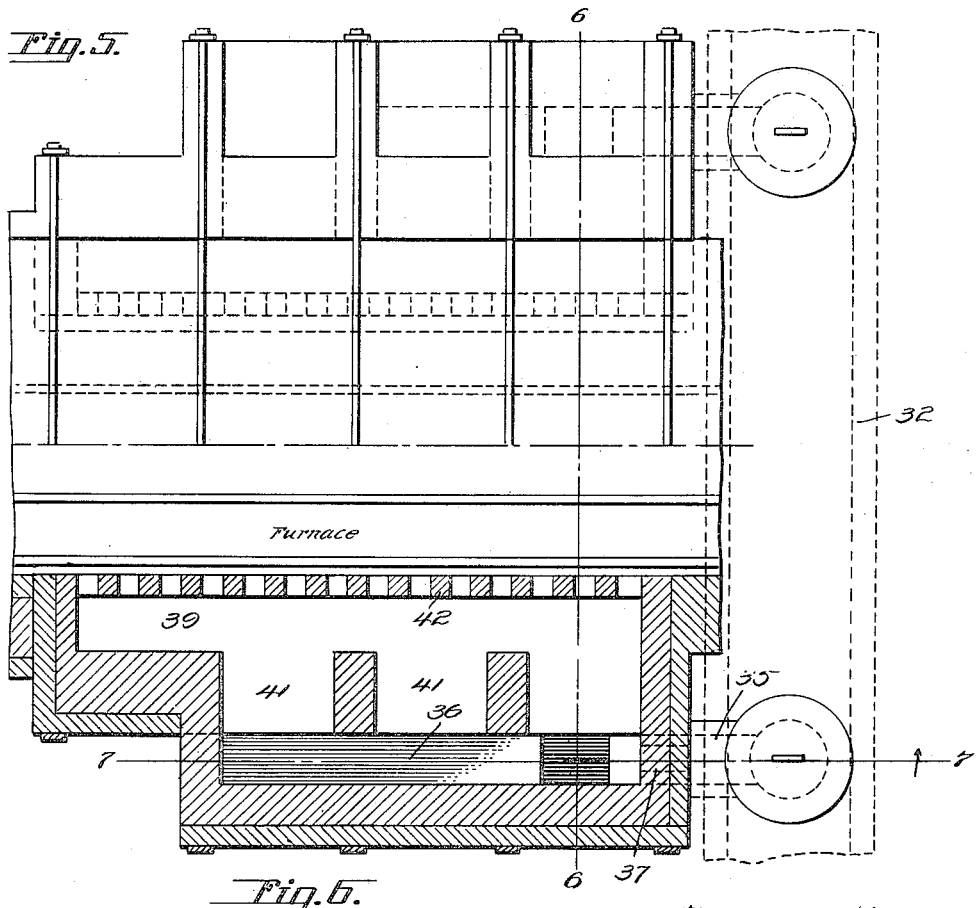
Fig. 5 is a top plan view partly in section of the furnace of the kiln.
Figure 6:
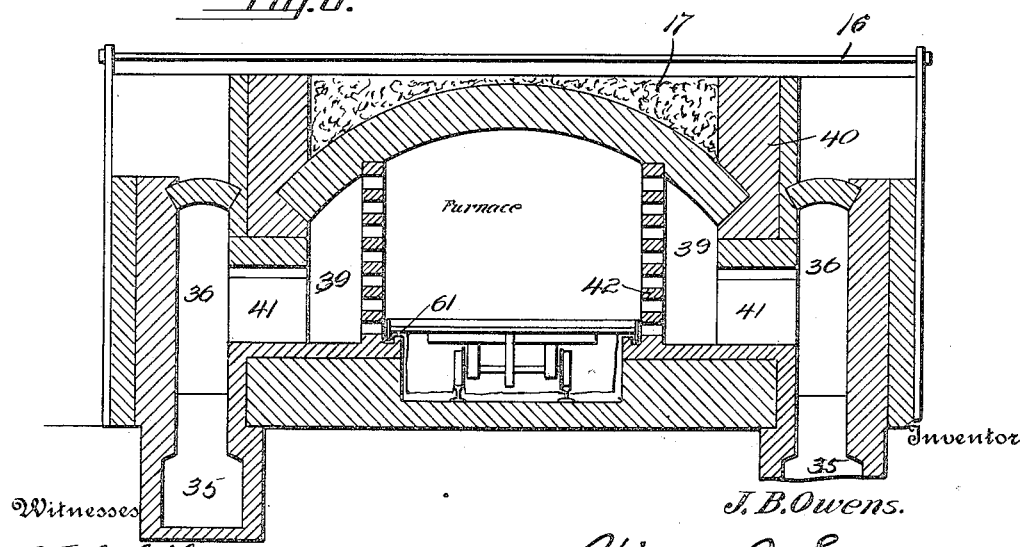
Fig. 6 is a transverse sectional view taken on the line 6—6 in Fig. 5.

The kiln structure of the present invention consists of a tunnel A which may be of any desired length and cross sectional dimensions. The walls, as well as the roof arch or arches of the kiln, are constructed of masonry, being reinforced by buck stays 15 and by rods 16. The side walls are extended above the top arch so as to form a trough or receptacle for insulating material, such as sand, indicated at 17, which serves to conserve the heat.

The kiln or tunnel may be regarded as being divided longitudinally into compartments or zones, each having peculiarities of construction to be hereinafter described. At the inlet and discharge end of the structure are air locks 18, 19, each protected by two movable gates 20 for the operation of which suitable means are provided which may include properly guided flexible elements 21 and counterweights 22.

Adjacent to the air lock 18 at the inlet end of the kiln is the coil drying zone 23, best seen in Figs. 2 and 3. In this zone or compartment, adjacent to the side walls thereof, are heating coils 24 which may be supplied with steam or hot water from a suitable source. The roof of the drying zone is formed by a double arch, namely, the lower arch 25 and the upper arch 26, said arches being separated by an intervening space 27 which communicates with the interior of the drying zone through openings 28 in the lower arch 25. The upper arch 26 has an outlet 29 to permit the escape of steam and hot air as well as products of combustion coming from the burning zone, as will be presently described.

Whenever desirable a separate fan or stack connected directly with the burning zone may be employed for taking off the products of combustion from the burning zone independently from the steam and hot air taken from the coil drying zone. The burning zone may be separated from the coil drying zone by a lock similar to that indicated at 19.

Extending beyond the drying zone is the burning zone 30, this being the zone or section of the kiln that extends between the drying zone and the furnace. In the burning zone the ware passing through the kiln is subjected first to preliminary heating by the products of combustion passing from the furnace in the direction of the entrance end of the kiln; the intensity of the heat increases gradually as the ware approaches the furnace, reaching the maximum in the furnace itself.

The furnace 31 is that part of the kiln located about midway between the two ends of the tunnel where the ware is subjected to direct burning heat. In the drawings the furnace has been shown constructed for the utilization of producer gas as fuel, but by proper modifications other fuel may be used. The fuel gas is supplied from a main 32 which is laid in the ground transversely beneath the kiln and which is provided with upwardly extending branches 33 having valves 34 to control the flow of gas through ducts 35 to the mixing chambers 36, the walls of which are provided with air inlets 37 which may communicate directly with the outer atmosphere, or they may be connected by ducts, one of which, 38, is indicated in Fig. 7, with a source of supply of preheated air. The circulation through these ducts may be either induced or forced. The mixing chambers 36 are separated from the combustion chambers 39 by walls 40 having arched openings 41, said combustion chambers being separated from the interior of the furnace proper by walls 42 of checker-work made of fire-brick or other refractory material. The checker-brick serves to distribute the heat uniformly, and it also acts as an accumulator for holding or retaining the heat at a point where the highest temperature is required. The checker-brick also acts as a mixer for the air and fuel gas, thereby serving to promote perfect combustion.

The mixing chambers and combustion chambers may be combined by eliminating the walls 40, whenever conditions may make this advisable, without affecting the principle of operation.

Between the furnace 31 and the air lock 19 extends the cooling zone 43, the walls of which are lined with hollow construction 44, producing vertical tubes or ducts 45 that communicate at their lower ends with air inlets 46 in the side walls of the kiln, as best seen in Fig. 9, the upper ends of the tubes or ducts 45 communicating with openings 47 in the lower roof arch 48 which is separated by an intervening space 49 from the upper roof arch 50 which has outlets 51, permitting a circulation of air which will reduce the temperature of the cooling zone, thereby permitting the ware to become gradually cooled during its passage through said zone and prior to its discharge through the air lock 19.

Circulation through the ducts 45 and the space 49 may be accelerated by supplying air under pressure, as by means of a blower, conventionally indicated at $49^b$ in Fig. 9, or in any other convenient manner. The effect of this would be to cool the burned material more rapidly and to produce a larger supply of heated air for other purposes.

In Fig. 2 there has been shown a fan or blower 52 the intake of which communicates with the outlet 29. The steam and hot air or gases coming through the outlet 29 may be discharged from the fan 52 through a duct 53 to a boiler indicated in dotted lines at 54, which is suitably constructed to utilize the heat carried by said products. In like manner the air discharged through the outlets 51 and which has become highly heated during its passage through the ducts 45 may be utilized, for example, by conveying the same through the ducts 38 and inlets 37 to the mixing chambers 36. The fan 52 also serves to set up a suction within the tunnel, whereby the products of combustion are impelled to travel from the furnace in the direction of the inlet of the kiln.

Obviously a stack may be substituted for the fan 52, or a combination of the two may be employed. Furthermore, the boiler may be connected at any point in the burning zone from which it may be most advisable to take off the outgoing gases for the purpose of utilizing the heat contained therein. This point may vary under varying conditions of operation, and it is to be determined by observation of the temperature and volume of the aforesaid outgoing gases.

The circulation of air in the drying zone of the kiln may be materially assisted by placing on the floor of said zone pipes 55 which may also extend through the air lock 18 so as to communicate with the outer atmosphere at the intake end of the kiln, as seen in Fig. 1, said pipes being provided in the portions thereof which are located within the drying zone with apertures 56, see Fig. 3, through which an inrush of air will be caused by pressure or by the suction set up by the fan 52. This will materially assist in carrying off the vapors given off by the ware during its passage through the heating chamber. It is extremely desirable to remove steam or vapors escaping from material which is being dried at as early a stage as possible, and this advantage is materially promoted by the arrangement of the pipes 55 as just described. These pipes may be extended farther into the tunnel and may also be divided into sections. They may be installed also without apertures for the purpose of radiant cooling by the circulation of air or water within the pipes.

For the purpose of conveying the ware that is to be burned through the kiln cars are provided, said cars traveling on a track composed of rails 57 that extend longitudinally through the entire kiln structure. The decks or platforms of these cars are protected by refractory material 59, and they are provided at the side edges thereof with downwardly extending flanges 60. Within the tunnel are formed longitudinal troughs 61 in which the flanges 60 depend, said troughs being kept filled with sand or other suitable material, as best seen at 62 in Fig. 11, thereby producing seals to obstruct the passage of products of combustion into the lower portion of the tunnel, and thus protecting the car structures against excessive and destructive heat. It is obvious that the sand seals may be continued beyond the furnace into the drying and cooling zones as far as may be required to insure thorough protection. The cars C are provided at their contacting ends with sealing devices embodying an L-flange 63 fixed on one car and a swinging plate 64 mounted on the other car, said swinging plate having flanges 65 for the reception between them of the horizontal portion of the L-flange 63 of the adjacent car; or the space between cars may be covered simply by a plate or piece of tubing properly held in place. These interengaging flange members, which may be constructed of or protected with refractory material, will constitute seals whereby the downward passage of products of combustion between the car ends will be prevented. Each car may also be provided with a suitable apron 66 transversely obstructing that portion of the tunnel which lies below the car platform, thereby obstructing and to a large extent preventing the passage of products of combustion beneath the car platforms.

To provide means for inspection of cars and track from below and for miscellaneous observations during the operation of the kiln, and also in order to provide means for maintaining a circulation of air under the cars to prevent injurious heating thereof, there may be formed, below the car tracks, tunnel spaces 71, 71', as shown in Figs. 12 and 13, the first named space extending from a point near the furnace zone in the direction of the inlet of the kiln and the space 71' extending from the outlet of the furnace zone beneath the cooling zone and in the direction of the outlet of the kiln. The tunnel spaces 71 and 71' are intersected by inspection tunnels 72, 72' that extend transversely beneath the kiln or, where a plurality of kilns are employed, beneath the series of kilns, so that an observer may pass through the said inspection tunnel transversely beneath the several kilns. It is found that occasionally the intense heat to which the cars are subjected will affect the same injuriously. It also sometimes happens that the floor or walls of the kiln may become warped or otherwise affected by the heat to such an extent as to interfere with the passage of material through the kiln. In such cases the inspection tunnels will permit an inspection and early detection of the injuries which may thus frequently be remedied, temporarily or otherwise, without involving the stoppage of the kiln and the loss entailed thereby. The inspection tunnels form inlets for currents of air which may be controlled by suitably arranged dampers, indicated at 73. These air currents, if permitted to pass from the inspection tunnels into the tunnel spaces 71, 71' will circulate through the spaces below the cars in the same direction that circulation takes place above the cars, thereby cooling the spaces below the cars to the extent of relieving the same from the danger of being injuriously affected by the heat, and at the same time promoting combustion in the spaces above the cars. It is found that when the circulation is properly adjusted the draft above and below the cars may be so balanced that the sand seal 61, 62 previously referred to may be dispensed with. The doors or valves that form the inlet to the transverse inspection passage beneath the kiln also constitute closures that will prevent the admission of air to the space below the cars. It follows that said space is virtually occupied by an air cushion which is not to any material degree subject to disturbance by any suction that may be set up above the cars. Again, the fan whereby suction is produced is generally utilized only for the purpose of removing the moisture laden air and not for the purpose of producing a forced draft. The fan therefore is run at low speed or at a speed so low as not to materially affect the condition of the air cushion below the cars. The word "air-cushion" as here used is intended to designate a dead air space, the air contained in which forms a heat insulation because said air, being stationary or inert, can not become heated to any considerable degree. As an illustration of the effectiveness of this heat insulation and also of the inactivity of the air below the car, it may be said that it is possible to attach a sheet of paper to the underside of the car and send it through the kiln without its position being disturbed by currents of air and without its being charred or otherwise affected by the heat of the car.

The cars may be driven through the tunnel by any suitable and convenient well known means. In Fig. 8 of the drawings there has been shown an endless chain 67 which may be driven in any convenient manner from a suitable source of power, said chain being guided over drums 68, and some of the links of said chain being provided with studs or projections 69 for engagement with which each of the cars is provided with a contact member 70. The endless chain 67 may extend through the air lock 18 at the entrance of the kiln and also some distance within the drying zone. When a car enters the air lock, it will be carried through said lock and into the drying zone, and such car will be utilized to push the cars ahead thereof through the kiln. It is obvious that any convenient and well known mechanical means may be utilized for the purpose of governing the operation of the driving chain, so that the movement may be interrupted when desired.

In stacking the ware that is to be burned on the cars it is obvious that care must be taken to arrange the same in such a manner as to permit the free passage of the products of combustion so that the ware will be evenly heated.

It will be seen from the foregoing description taken in connection with the drawings hereto annexed that I have produced a kiln of simple and effective construction in which the burning of all kinds of pottery ware and clay products and other materials and articles may be carried on continuously and uninterruptedly in a simple and thoroughly effective manner, it being particularly noted that the ware will be thoroughly dried at an initial stage, being thereafter subjected to gradually increasing heat during its passage through the burning zone and eventually being subjected to a burning heat of a degree sufficient to produce the desired results, the ware being subsequently gradually cooled before being discharged to the outer atmosphere and thereby subjected to normal temperature. By this treatment it is found that the loss from cracking and other defects, the working expenses for labor and the like, as well as the time required to obtain the desired results are all greatly reduced. In all respects it is found that the improved kiln is thoroughly useful and efficient for the purposes for which it is provided.

Having thus described the invention, what is claimed as new is:—

1. A kiln consisting of a tunnel structure having intermediate the ends thereof a furnace, and means for heating the same to the required degree, a burning zone extending from the furnace in the direction of the inlet of the tunnel, a drying zone between the burning zone and the inlet and normally open thereto and receiving draft from the burning zone, and heat radiating means within the drying zone, said heat radiating means being independent of the walls of the structure, said drying zone being also equipped with means for the circulation of air therethrough from the bottom thereof in an upward direction.

2. A kiln consisting of a tunnel structure having intermediate the ends thereof a furnace, and means for heating the same to the required degree, a burning zone extending from the furnace in the direction of the inlet of the tunnel, a drying zone between the burning zone and the inlet and normally open thereto and receiving draft from the burning zone, and heat radiating means within the drying zone, said heat radiating means being independent of the walls of the structure, said drying zone being also equipped with means for the circulation of air therethrough from the bottom thereof in an upward direction, said means including air ducts in the bottom of the drying zone and apertures in the roof portions of said drying zone with which draft inducing means are connected.

3. A kiln comprising a tunnel structure, car tracks extending through said structure, tunnel spaces, one of which extends beneath the car track in the burning zone in the direction of the inlet of the kiln and another extending beneath the car track in the cooling zone in the direction of the inlet of the kiln, and inspection tunnels intersecting the tunnel spaces and constituting air inlets for the same, and means whereby the passage of air currents from the inspection tunnels to the tunnel spaces may be controlled.

4. A tunnel kiln provided with an inspection and air supplying tunnel extending beneath the kiln, and means controlling communication between the kiln and the inspection and air supplying tunnel.

5. A tunnel kiln provided with an inspection space extending beneath the kiln and exposed thereto, an air supplying tunnel communicating with said inspection space, and means controlling communication between the inspection space and the air supplying tunnel.

6. A tunnel kiln provided with inspection spaces extending lengthwise beneath the kiln and exposed thereto, an inspection and air supplying tunnel communicating with said inspection spaces, and regulable closures for independently controlling communication between the air supplying tunnel and the respective inspection spaces.

In testimony whereof I affix my signature.

JOHN B. OWENS.